April 12, 1938.   A. S. CAMBRIDGE   2,114,210
MOWING MACHINE
Filed Sept. 13, 1937
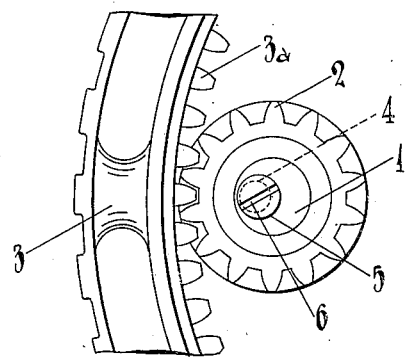
FIG-1-
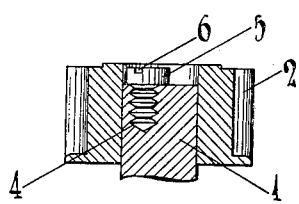
FIG-2-
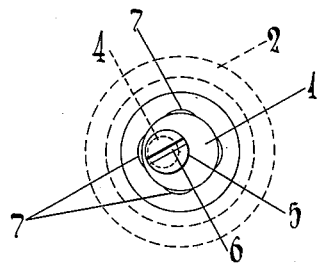
FIG-3-
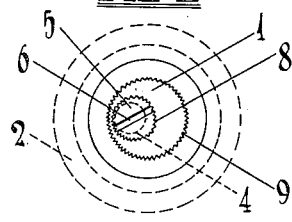
FIG-4-
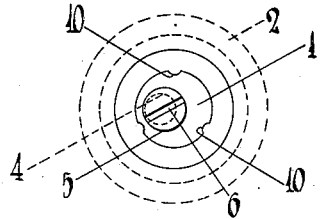
FIG-5-
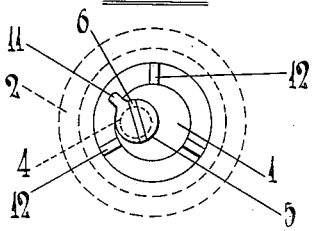
FIG-6-
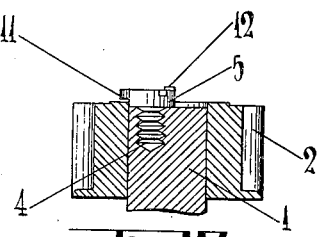
FIG-7-
A. S. Cambridge
Inventor
By: Glascock Downing & Seebold
Attys.

Patented Apr. 12, 1938

2,114,210

UNITED STATES PATENT OFFICE 2,114,210

MOWING MACHINE

Allan Steward Cambridge, Omarama, New Zealand

Application September 13, 1937, Serial No. 163,690
In New Zealand August 19, 1937

7 Claims. (Cl. 287—52.09)

The invention relates to mowing machines of the type having a rotary cutter operable about an axis—parallel to, and in conjunction with a fixed horizontal cutter bar, mounted to travel along the ground a short distance above the surface thereof, and wherein it is the usual practice to provide one way driving gear between the rotary cutter spindle and gear wheels thereon, so that the rotary cutter is operated to function as such, only upon forward movement of the machine, said rotary cutter remaining inoperative during rearward movement of the machine.

It has been proposed in connection with mowing machines of the aforesaid type, to provide reverse action gear between the rotary cutter spindle and gear wheels thereon, said reverse action gear being capable of adjustment to enable the rotary cutter to be driven in the reverse direction to that in which it turns during normal cutting operations, for the purpose of facilitating the grinding of the edges of the blades of the rotary cutter into true and correct relationship with the fixed cutter bar.

The object of the present invention is to provide an improved form of reverse action gear for use between the rotary cutter spindle and the gear wheels thereon, whereby the fitting of said reverse action gear is simplified, in addition to obtaining a secure lock between the spindle and the gear wheels, when required.

As provided by this invention the improved reverse action gear comprises a pin formed with a head set to one side thereof, and fitted in an end of the rotary cutter spindle so as to be capable of being turned to cause said head to engage a gear wheel thereon and lock same to said spindle.

The head of the locking pin so fitted, can be given a variety of forms, as illustrated in the accompanying drawing, in conjunction with which the invention will be more particularly described.

In the drawing:—

Figure 1 is an elevation showing the locking pin formed with a head made eccentric thereto, and also showing portion of one of the driving wheels of the mowing machine, Figure 2 is a sectional view of the gear wheel and spindle appearing in Figure 1 and also showing the locking pin with the eccentric head, Figures 3, 4 and 5 are elevations illustrating modifications, while Figures 6 and 7 illustrate by means of an elevation, and a sectional view respectively, a form of the invention in which an extension of the head of the locking pin extends over the end of the gear wheel.

Referring to Figures 1 and 2 of the drawing, 1 represents the spindle of the rotary cutter, of the mowing machine, and 2 a gear wheel thereon which is in mesh with and is driven by the internal toothed rack 3a formed integral with a running wheel 3 of the machine, the usual one way driving gear (not shown) being employed between said spindle 1 and said wheel 2, to cause the former to be rotated in the correct direction when the machine is moved forward.

The reverse action means for locking the spindle 1 and the wheel 2 together, in order that the latter may be made to impart turning movement to said spindle 1, the reverse to that in which it rotates during normal operation of the machine, comprises a pin 4 preferably screwed into an end of the spindle 1 and formed with a head 5 made eccentric to the pin body.

The wheel 2 projects beyond the end of the spindle 1, far enough to accommodate the head 5, said pin 4 being positioned in the spindle 1, so that it can be turned to cause that portion of the head 5 set to one side of the pin 4, to bear against the internal surface of the wheel 2, turning movement of the latter having the effect of tightening the gripping action between the head 5 and the wheel 2.

In order to enable the pin 4 to be adjusted by means of a screw driver or the like, the head 5 can be formed with a slot 6 therein, or said head 5 can be formed for gripping by any other suitable tool.

As illustrated in Figure 3, the internal surface of the wheel 2 can be formed with one or a plurality of recesses 7 therein into any one of which the projecting side of the head 5 of the pin 4 can be moved, in order to obtain a secure grip of the wheel 2.

Another way of ensuring positive engagement between the head 5 of the pin 4, and the internal surface of the wheel 2, is to provide teeth 8 (Figure 4), on the periphery of the head 5, and teeth 9 on the internal surface of the wheel 2, so that upon the head 5 being made to engage the latter, the teeth 8 and 9 mesh with each other and provide a positive lock between the spindle 1 and the wheel 2.

A further way of ensuring a positive grip between the head 5 and the wheel 2, is to provide on the internal surface of the wheel 2, one or more projections 10 (Figure 5), which, after the head 5 is turned to engage the wheel 2, follows around behind said head 5 until one of said projections 10 engages against the head and so positively locks the wheel 2 and spindle 1 together.

A still further way of ensuring the wheel 2 and the spindle 1 being positively locked together, is to mount the wheel 2 on the spindle 1 and insert the pin 4 in the latter so that the head 5 can be turned to cause an extension 11 from the head 5 to overlap the wheel 2 (Figures 6 and 7), and be engaged by any one of the projections 12 on the latter upon said wheel turning.

While the locking mechanism has been described particularly for use in a lawn mower it will be apparent that the locking means is applicable to other arts wherein it is desired to lock a rotatable member on a shaft. In other words the invention is adapted to lock two relatively movable members and it will be apparent that modifications may be made therein by those skilled in the art. Such modifications may be made without departing from the spirit and scope of the invention as set forth in the appended claims.

What I do claim and desire to obtain by Letters Patent of the United States of America is:—

1. A shaft locking mechanism comprising, a spindle, a gear wheel rotatably mounted on the spindle adjacent an end thereof in such a manner as to extend slightly beyond the end of the spindle, a pin extending into the end of the spindle in a longitudinal direction with respect to said spindle, said pin having a head fixed thereto eccentrically with respect to the axis thereof so that when the pin is turned about the axis the head will engage the internal surface of the gear wheel and lock the gear wheel against rotary movement on the spindle.

2. A reel shaft locking mechanism comprising, a reel spindle, a gear wheel rotatably mounted on the spindle with a part thereof extending beyond an end of the spindle, said spindle having a threaded opening extending into the spindle from the end thereof in a longitudinal direction with respect to the axis of the spindle, a threaded pin arranged in said opening, said pin having an integral head eccentrically arranged with respect to the body thereof so that when the pin is turned about the axis thereof the head will engage the inner surface of the gear wheel and lock the gear wheel against rotary movement on the spindle.

3. A reel shaft locking mechanism for use in a lawn mower comprising, a reel spindle, a gear wheel rotatably mounted on the spindle with a part thereof extending beyond an end of the spindle, said spindle having a threaded opening extending into the spindle in a longitudinal direction with respect to the axis of the spindle and inwardly from the end thereof, a threaded pin having a head fixed to the end thereof and eccentrically mounted with respect to the body of the pin, said pin being arranged in said opening with the head thereof engaging the end of the shaft, so that the friction between said head and the end of said shaft will prevent rotation of the pin with respect to the spindle during vibration of the mower, whereby the pin may be unscrewed and the head will engage the gear wheel to lock the same against rotary movement on the shaft.

4. A reel shaft locking mechanism for use in a lawn mower comprising, a reel spindle, a gear wheel rotatably mounted on said spindle, said spindle having a threaded opening in the end thereof, a threaded pin arranged in said opening, an eccentrically mounted head fixed to said pin and an extension carried by the head, at least one projection carried by the gear wheel whereby the gear wheel may be locked against rotary movement on the spindle by turning said pin to cause the head to engage the gear wheel and the locking is reestablished if vibration of the mower should cause turning of the pin relatively to the spindle by the projection engaging said extension.

5. A reel shaft locking mechanism for use in a lawn mower comprising, a gear wheel rotatably mounted on the spindle with a part thereof extending beyond an end of the spindle, said spindle having a threaded opening extending inwardly from the end thereof and in a longitudinal direction with respect to the axis of the spindle, a threaded pin arranged in said opening, an eccentrically mounted head fixed to said pin and an extension carried by the head, at least one axially extending projection carried by the gear wheel whereby the gear wheel may be locked against rotary movement on the spindle by turning said pin to cause the head to engage the inner surface of the gear wheel and the locking is reestablished if vibration of the mower should cause rotating slippage of the gear wheel on the spindle by the projection engaging said extension.

6. A reel shaft locking mechanism for use in a lawn mower comprising, a gear wheel rotatably mounted on the spindle with a part thereof extending slightly beyond the spindle, said spindle having a threaded opening extending inwardly from the end thereof and in a longitudinal direction with respect to the axis of the spindle and the axis of said opening being displaced with respect to the axis of said spindle, a threaded pin arranged in said opening, an arcuate shaped head eccentrically mounted on the end of said pin, an extension projecting radially from the periphery of said head and from a peripheral portion thereof which lies substantially at the greatest distance from the axis of the pin, a plurality of axially extending projections carried by the gear wheel, whereby the gear wheel may be locked against rotary movement on the spindle by turning the pin to cause an arcuate portion of the head to engage the inner surface of the gear wheel and the locking is re-established if vibration of the mower should cause rotating slippage of the gear wheel on the spindle by one of the projections engaging said extension.

7. A reel spindle locking mechanism adapted for use in a lawn mower comprising, a reel spindle, a gear wheel rotatably mounted on the spindle adjacent an end thereof in such a manner as to extend slightly beyond the end of the spindle, said gear wheel having a recess formed in the internal surface thereof, a pin extending into the end of the spindle and in a longitudinal direction with respect thereto, said pin having a head fixed thereto eccentrically with respect to the axis of the pin so that when the pin is turned about the axis thereof the head will engage the recess formed in the internal surface of the gear wheel and lock the gear wheel against rotary movement on the spindle.

ALLAN STEWARD CAMBRIDGE.